United States Patent [19]

Akiyama et al.

[11] 4,360,767

[45] Nov. 23, 1982

[54] MOTOR SPEED CONTROL APPARATUS

[75] Inventors: Ryo Akiyama, Sakai; Makoto Gotou, Kadoma, both of Japan

[73] Assignee: Matsushita Electric Industrial Co., Ltd., Osaka, Japan

[21] Appl. No.: 119,368

[22] Filed: Feb. 7, 1980

[30] Foreign Application Priority Data

Feb. 9, 1979 [JP] Japan .................................. 54-14728
Feb. 13, 1979 [JP] Japan .................................. 54-15729

[51] Int. Cl.³ .............................................. H02P 5/16
[52] U.S. Cl. .................................... 318/318; 318/314
[58] Field of Search ................. 318/314, 318, 341, 312

[56] References Cited

U.S. PATENT DOCUMENTS 3,206,665 9/1965 Burlingham ......................... 318/312
3,898,690 8/1975 Desai ..................................... 360/51
3,974,428 8/1976 Hafle ................................... 318/318
4,155,033 5/1979 De Bell et al. ...................... 318/314

FOREIGN PATENT DOCUMENTS

54-720 1/1979 Japan .................................. 318/318

Primary Examiner—David Smith, Jr.
Attorney, Agent, or Firm—Wenderoth, Lind & Ponack

[57] ABSTRACT

A motor speed control apparatus includes a motor, a frequency generator for generating a detective frequency signal, the frequency of which is proportional to the motor speed, and a control signal generator. A rotational speed-error pulse train is produced by the control signal generator and is used for improving the load characteristics of the motor. The rotational speed of the motor is maintained constant at a predetermined speed, which is proportional to the reference frequency, for any load torque, the motor speed is not influenced by ambient temperature changes or long term characteristic variations of the electronic components utilized. Furthermore, the transient response of the motor is fast and the motor starts rotating smoothly and stably.

6 Claims, 18 Drawing Figures

MOTOR SPEED CONTROL APPARATUS

BACKGROUND OF THE INVENTION

1. Field of the Invention

This invention relates to a motor speed control apparatus; more particularly, this invention relates to an apparatus which has a motor, a frequency generator for generating a detective frequency signal proportional to the rotational speed of the motor, and a control signal generator for generating a control voltage signal which corresponds to the rotational speed-error of the motor for the reference frequency signal.

2. Description of the Prior Art

In a prior art systems, phase-controlled motor is widely used in order to stably control the rotational speed of the motor used, for example, for a record player. An advantage of the phase-controlled motor is that the motor rotates very accurately by using a stable frequency signal generated by a crystal oscillator or the like, and used for the reference frequency. Accordingly, the motor rotates very stably and uniformly for any load torque.

However, the phase-controlled motor comprises two loops, i.e. a speed feedback loop and a phase locked loop, and the construction of the phase-controlled motor is complicated, so that it is difficult to design the phase-controlled motor, and it is also bothersome to adjust it. In addition, these two loops interact with each other, and the motor suffers a bad effect from the interaction of these two loops, and it takes a long time to lock the motor, when the motor starts rotating.

Furthermore, according to a conventional phase-locked motor, the action points of these two loops are varied and the lock range of the motor is reduced because of the influence of ambient temperature changes or long term characteristic variations of the electronic components utilized.

SUMMARY OF THE INVENTION

Therefore, the object of this invention is to provide a motor speed control apparatus which is free from the above-mentioned defects.

This object is achieved according to this invention by providing motor control apparatus which comprises a motor, a frequency generating means coupled to said motor to be controlled for generating a detective frequency signal having a frequency proportional to the rotational speed of said motor, and a control signal generating means coupled to said frequency generating means for generating a control voltage signal which controls the motor torque, wherein said control signal generating means comprises: a detective digital pulse train generating means for generating a detective digital pulse train from the output signal of said frequency generating means, the pulse width of said detective digital pulse train corresponding to the period of said detective frequency signal; a clock pulse generating means for generating a stable clock pulse train, the period of which is much shorter than the period of said detective digital pulse train; a fixed-width pulse train generating means having a divide-by-N counter (N being an integer), which starts counting the output pulse of said clock pulse generating means when said divide-by-N counter is triggered by the positive (or the negative) edge of said detective digital pulse train, and generating a fixed-width pulse train, the pulse width of which is equal to the counting time of said divide-by-N counter; a pulse combining means having two input terminals, to one of which the output terminal of said detective digital pulse train generating means is coupled, and to the other of which the output terminal of said fixed-width pulse train generating means is coupled, said pulse combining means producing a rotational speed-error pulse train by combining an output signal from said detective digital pulse train generating means and an output signal from said fixed-width pulse train generating means; a low pass filtering means, coupled to said pulse combining means, and changing said rotational speed-error pulse train to a smooth voltage signal corresponding to the pulse width of said rotational speed-error pulse train; a low frequency reinforcing means, coupled to said low pass filtering means, and reinforcing the low frequency components included in said rotational speed-error pulse train; and a motor driving means, coupled to said low frequency reinforcing means, and driving said motor, whereby said motor generates a torque corresponding to the output of said motor driving means.

The above object is also achieved according to this invention by providing a motor control apparatus, which comprises a motor, a frequency generating means coupled to said motor to be controlled for generating a detective frequency signal having a frequency propotional to the rotational speed of said motor, and a control signal generating means coupled to said frequency generating means for generating a control voltage signal which controls the motor torque, wherein said control signal generating means comprises: a detective digital pulse train generating means for generating a detective digital pulse train from the output signal of said frequency generating means; a clock pulse generating means for generating a stable clock pulse train, the period of which is much shorter than the period of said detective digital pulse train; a first fixed-width pulse train generating means having a divide-by-N counter (N being an integer), which starts counting the output pulse of said clock generating means when said divide-by-N counter is triggered by the positive (or the positive) edge of said detective digital pulse train, and generating a first fixed-width pulse train, the pulse width of which is equal to the counting time of said divide-by-N counter; a second fixed-width pulse train generating means having a divide-by-M counter (M being an integer), which starts counting the output pulse of said clock generating means when said divide-by-M counter is triggered by the positive (or the negative) edge of said first fixed-width pulse train, and generating a second fixed-width pulse train, the pulse width of which is equal to the counting time of said divide-by-M counter; a pulse combining means having two input terminals, to one of which the output terminal of said first fixed-width pulse train generating means is coupled, and to the other of which the output terminal of said second fixed width pulse train generating means is coupled, said pulse combining means producing a rotational speed-error pulse train by combining an output signal from said first fixed-width pulse train generating means and an output signal from said second fixed-width pulse train generating means; a low pass filtering means, coupled to said pulse combining means, and changing said rotational speed-error pulse train to a smooth voltage signal corresponding to the pulse width of said rotational speed-error pulse train; a low frequency reinforcing means, coupled to said low pass filtering means, and reinforcing the low frequency components included in said rotational speed-error pulse train; and a motor driving means coupled to said low frequency reinforcing means, and driving said motor, whereby said motor generates a torque corresponding to the output of said motor driving means.

The motor speed control apparatus according to this invention, which comprises only one speed feedback loop, has excellent stability characteristics which are comparable to that of a conventional phase-controlled motor having two control loops.

BRIEF DESCRIPTION OF THE DRAWINGS

This object and features of this inventions will become apparrent from consideration of the following detailed description of the invention, taken together with the accompanying drawings, in which:

FIG. 9 and FIG. 10 are curves illustrating the motor speed control characteristics of this invention and the conventional speed control apparatus.

DESCRIPTION OF THE PREFERRED EMBODIMENTS

Figure 1:
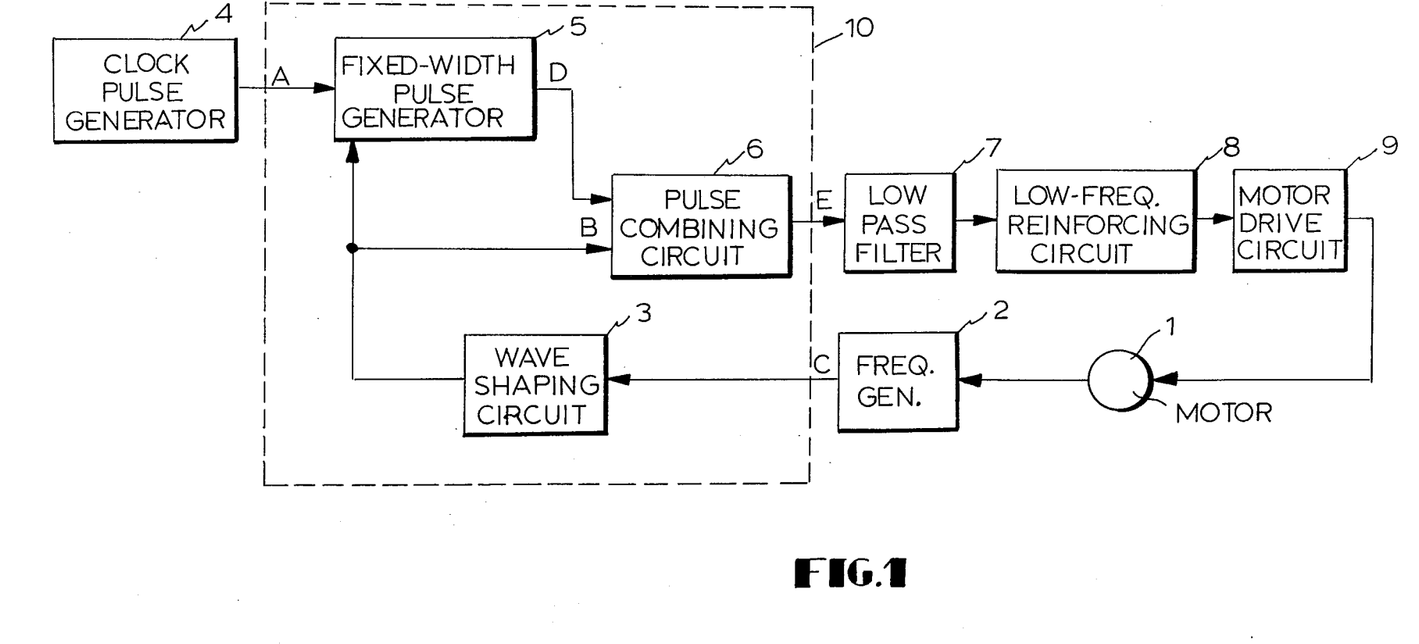
FIG. 1 is a block diagram of a motor speed control apparatus embodying the concept this invention.

Referring to FIG. 1, the construction of the motor speed control apparatus of this invention is described below.

Reference numeral 1 is a DC motor and reference numeral 2 is a frequency generator for generating a frequency signal proportional to the rotational speed of the motor 1. Reference numeral 3 is a wave shaping circuit which changes the output wave of the frequency generator 2 to a rectangular wave and divides its frequency. Reference numeral 4 is a clock pulse generator composed of a stable oscillator, such as a crystal oscillator. Reference numeral 5 is a fixed-width pulse generator composed of a divide-by-N counter (N is an integer), which is triggered by a negative edge of the output signal of the wave shaping circuit 3, such that its output level is held at a logic "1" level until it counts N output pulses generated by the clock pulse generator 4, and whose output level is changed to a logic "0" level thereafter.

Reference numeral 6 is a pulse combining circuit which combines the output pulse of the wave shaping circuit 3 and the output pulse of the fixed-width pulse generator 5, so as to generate a pulse, the width of which is proportional to the rotational speed-error of the motor 1 with respect to the reference frequency (reference rotational speed). Reference numeral 7 is a low-pass filter smoothing the output pulse of the pulse combining circuit 6 and changing the output pulse to a DC voltage signal. Reference numeral 8 is a low-frequency reinforcing circuit which reinforces low-frequency components (in which a DC component is contained) contained in the output of the low-pass filter 7.

Reference numeral 9 is a motor drive circuit amplifying the output of the low-frequency circuit 8 and supplying the electric power to the motor 1. The wave shaping circuit 3, the fixed-width pulse generator 5 and the pulse combining circuit 6 constitute a rotational speed-error detecting circuit 10. The motor 1, the frequency generator 2, the rotational speed-error detecting circuit 10, the low-pass filter 7, the low-frequency resinforcing circuit 8 and the motor drive circuit 9 constitute a speed feedback loop.

Figure 2:
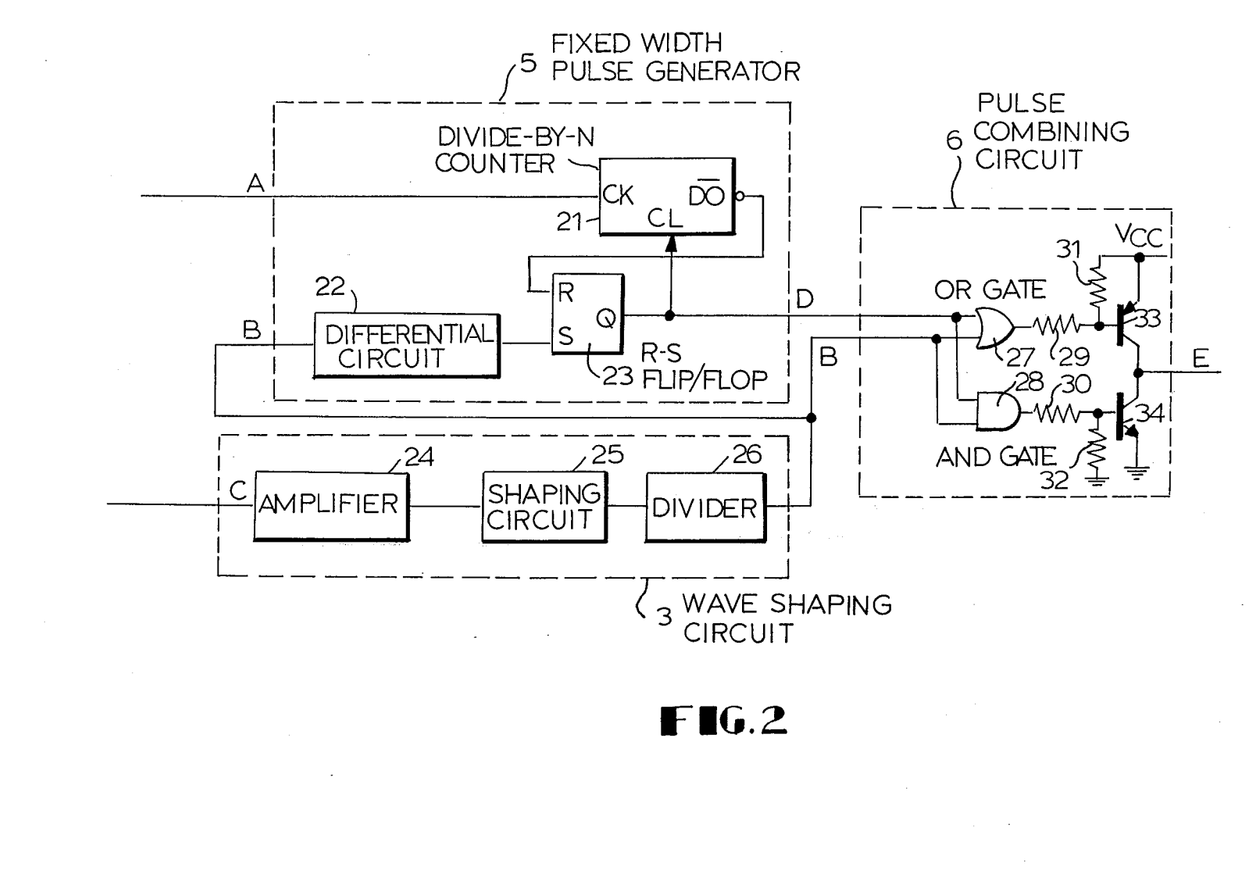
FIG. 2 is a schematic diagram of a rotational speed-error detecting circuit included within the system of FIG. 1.

FIG. 2 is a concrete schematic diagram of the rotational speed-error detecting circuit 10. Referring to FIG. 2, reference numeral 21 is a divide-by-N counter having a clock input terminal CK, an output terminal $\overline{D0}$ and a clear (reset) terminal CL, and it is designed so that, by applying a logic "0" level to the CL terminal, the counter may be reset to an all logic "0" state. Reference numeral 22 is a differential i.e.-differentrator circuit for differentiating the negative edge of the input signal at the B point, and reference numeral 23 is a reset-set flip-flop (R-S flip-flop) triggered by a logic "0" level. The divide-by-N counter 21, differential circuit 22 and R-S flip flop 23 constitute the fixed-width pulse generator 5.

Now, the operation of the fixed-width pulse generator 5 shown in FIG. 2 will be described. In the first case, it is assumed that the R-S flip-flop 23 is the logic "0" state, namely, at a Q terminal is the logic "0" level, and the input pulse signal is applied to the B point. At this time, as the input pulse signal is differentiated by the differential circuit 22 and the differentiated signal sets the R-S flip-flop 23, the Q terminal level is changed to a logic "1" level from a logic "0" level. Since the Q terminal is connected to the CL terminal of the divide-by-N counter 21, the divide-by-N counter 21 is released from its reset (clear) state, and starts counting up the clock pulses applied to the CK terminal (A point).

Then, when the divide-by-N counter 21 counts to N, a $\overline{D0}$ terminal level changes to a logic "0" level from the logic "1" level, and the R-S flip flop 23 is reset. Thus, the Q terminal level is then held at a logic "0" level, until the next input pulse signal is applied to the B point.

That is to say, the fixed-width pulse generator 5, which is triggered by the negative edge of the input signal at the B point, generates the fixed-width pulse, the pulse width of which is $N\tau$, where $\tau$ is the period of the clock pulse and N is the count number of the divide-by-N counter 21.

Reference numeral 24 is an amplifier for amplifying the output of the frequency generator 2, and reference numeral 25 is a shaping circuit for changing the output waveform into a rectangular wave. Reference numeral 26 is a divide by 2 divider, and the amplifier 24, the shaping circuit 25 and the divider 26 constitute the wave shaping circuit 3.

Reference numeral 27 is an OR gate, and reference numeral 28 is an AND gate. Reference numeral 29 is a resistor supplying a base current to a PNP transistor 33, and reference numeral 30 is a resistor supplying a base current to an NPN transistor 34. Reference numerals 31 and 32 are resistors preventing base leakage currents from affecting the transistors 33 and 34. The OR gate 27, AND gate 28 and resistors 29, 30, 31 and 33 constitute the pulse combining circuit 6. The output terminal of the pulse combining circuit 6 (E point) has three states as will be described below.

A 1st state is a current drawing mode, which occurs when the levels of the D point and the B point are both at logic "1" levels. A 2nd state is a current spouting mode, which occurs when the levels of the D point and the B point are both at logic "0" levels. A 3rd state is a high impedance mode, which occurs when the levels of the D point and the B point are different from each other.

Figure 3:
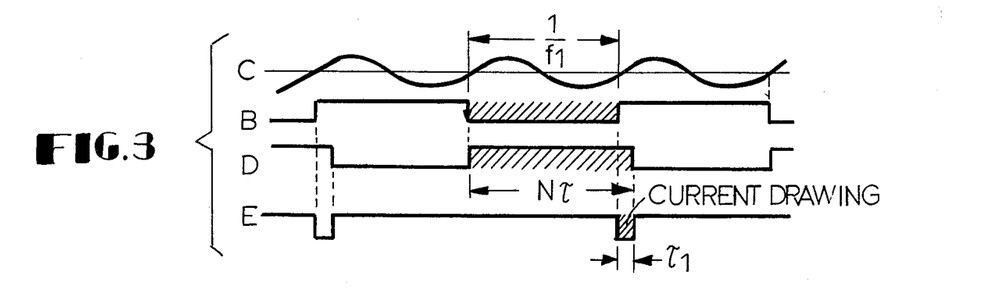
FIG. 3, FIG. 4 and FIG. 5 are timing charts for explaining the operation of the rotational speed-error detecting circuit shown in FIG. 2.
Figure 4:
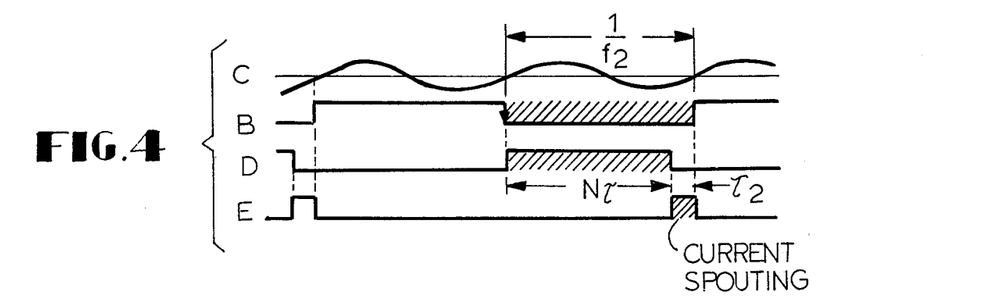
Figure 5:
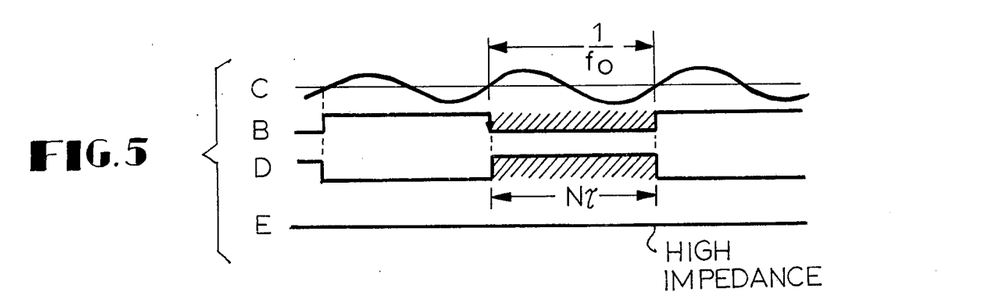

FIG. 3, FIG. 4 and FIG. 5 show the timing charts explaining the operations of the embodiment shown in FIG. 1 or FIG. 2. Reference symbols C, B, D and E used in FIG. 3, FIG. 4 and FIG. 5 correspond to the symbols C, B, D and E in FIG. 1 or FIG. 2. FIG. 3 shows the case where the rotational speed of the motor 1 is faster than the reference rotational speed. FIG. 4 shows the case where the rotational speed of the motor 1 is slower than the reference rotational speed. FIG. 5 shows the case where the rotational speed of the motor 1 is equal to the reference rotational speed.

Referring to FIG. 3, the output frequency (at the C point) of the frequency generator 2 is $f_1$. In this case, assuming that the value $\tau$, which is the period of the clock pulse at the A point, and the value N, which is the count number of the divide-by-N counter 21 composing the fixed-width pulse pulse generator 5 are the constant values given by the following expression:

$$N \times \tau = 1/f_o \qquad (1)$$

(where $f_o$ is the output frequency of the frequency generator 2 when the rotational speed of the motor 1 is locked at the reference rotational speed), during the time period $\tau_1$, which is expressed by equation (2) below, the levels at the B point and the D point both become logic "1" levels and the state at the E point corresponds to its current-drawing mode.

$$\tau_1 = N\tau - \frac{1}{f_1} = \frac{1}{f_o} - \frac{1}{f_1} \qquad (2)$$

So, the pulse combining circuit 6 draws a current from the input of the low-pass filter 7, and drops the output voltage level of the low-pass filter 7. Because the output terminal of the low-pass filter 7 is connected to the motor driving circuit 9 by way of the low-frequency reinforcing circuit 8, the dropped output level of the low-pass filter 7 decreases the output frequency of the frequency generator 2, namely the frequency at the C point, by reducing the rotational speed of the motor 1.

Referring to FIG. 4, assuming that the output frequency of the frequency generator 2 is $f_2$, during the time period $\tau_2$, which is expressed by equation (3) below, the levels at the B point both and D point become the logic "0" levels and the state at the E point corresponds to its current-spouting mode.

$$\tau_2 = \frac{1}{f_2} - N\tau = \frac{1}{f_2} - \frac{1}{f_o} \qquad (3)$$

So, the pulse combining circuit 6 supplies a current to the input of the low-pass filter 7, and raises the output voltage level of the low-pass filter 7. The raised output level of the low-pass filter 7 passing through the low-frequency reinforcing circuit 8 and the motor driving circuit 9 increases the output frequency of the frequency generator 2 by increasing the rotational speed of the motor 1.

Referring to FIG. 5, as there is no time period when the level at the B point and the level at the D point are identical to each other, the transistors 33 and 35 remain in the "OFF" states and the output terminals of the pulse combining circuit 6 corresponds to its high-impedance mode. Since there is no current drawing and spouting at the E point, the output voltage level of the low-pass filter 7 is held constant and the rotational speed of the motor 1 is maintained constant.

As evident from the foregoing, when the rotational speed of the motor 1 is constant, the expression (4) below is satisfied.

$$1/f_G = N\tau \qquad (4)$$

where $f_G$ is the output frequency of the frequency generator 2.

Figure 6:
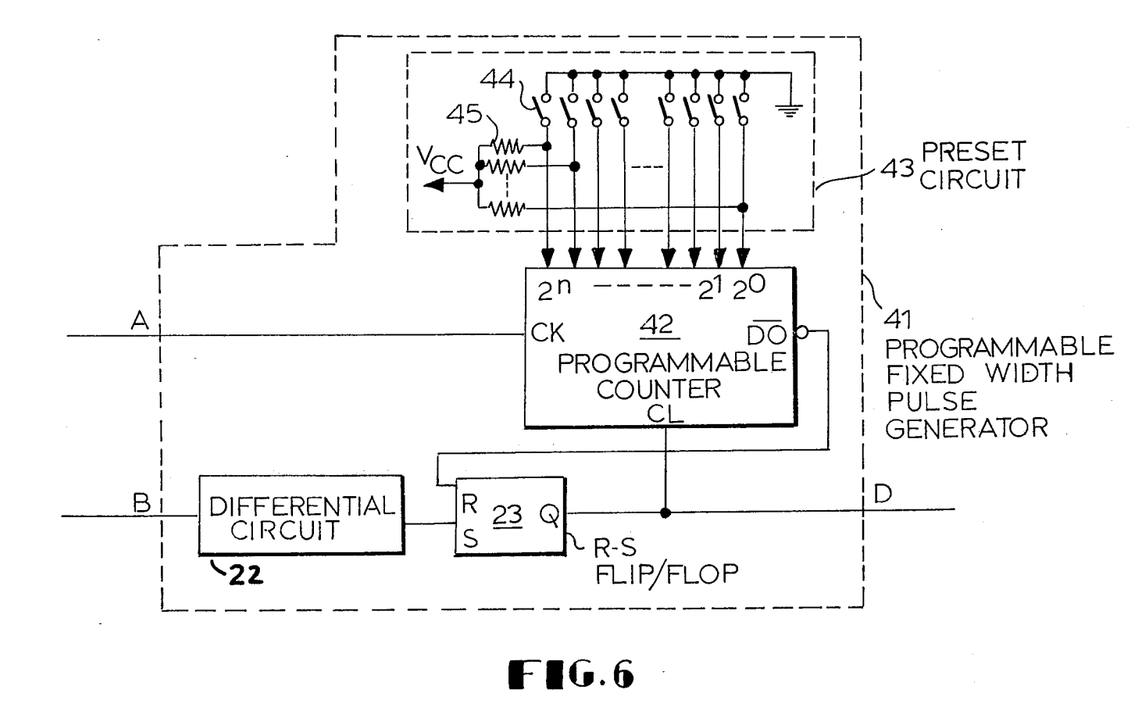
FIG. 6 is a schematic diagram of a programmable fixed-width pulse generator to be substituted for a fixed-width pulse generator shown in FIG. 2, when the motor speed control apparatus is of a speed adjustable mode.

FIG. 6 shows a schematic diagram of a programmable fixed-width pulse generator 41, which can be substituted for the fixed-width pulse generator 5 shown in FIG. 2, when the motor speed control apparatus is of the speed adjustable mode type. In FIG. 6, reference numerals 22 and 23 are the differential circuit and the R-S flip-flop as mentioned above. Reference numeral 42 is a preset counter composed of a programmable counter having preset input terminals and various gate circuits. The $\overline{D0}$ terminal level of the programmable counter becomes a logic "0" level when the counter counts up to the value which has been preset at the present input terminals in binary form. Reference numeral 43 is a preset circuit for presetting the binary numbers to the preset counter 42, and it is composed of switches 44 and resistors 45 for providing a logic "1" level.

Each of the preset input terminals of the preset counter 42 corresponds to figures $2^0, 2^1, \ldots 2^n$, respectively, and by selecting the desired figures by the switches 44, the programmable fixed-width pulse generator 41 generates pulses of desired widths.

In above mentioned system, as explained in the timing charts shown in FIG. 5, the rotational speed of the motor 1 is locked in when equation (4) is satisfied. Accordingly, with a change of the value of N, which is the count number of the preset counter 42 effected, by manipulating the switches 44, the value of $N\tau$ changes, and the value of $f_G$, which is the output frequency of the frequency generator 2, (namely, the rotating speed of the motor 1), also changes.

In the above descriptions, the preset circuit 43 is composed of the switches 44 but is not limited to such switches. It is possible that the preset circuit is composed of digital switches having a BCD (Binary Coded Decimal) code, or logical circuits composed of gates and counters.

Figure 7A:
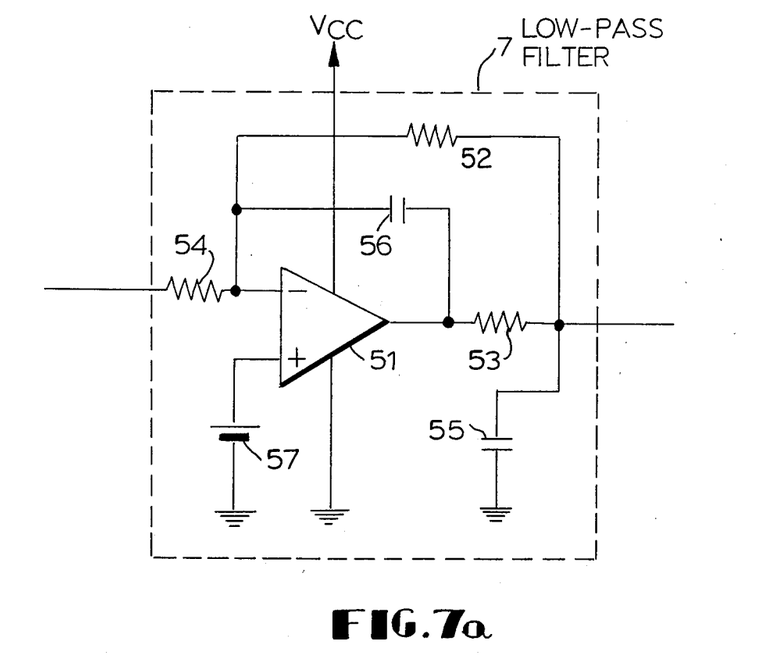
FIG. 7a is a schematic diagram of a low-pass filter included within the system of FIG. 1.
Figure 7B:
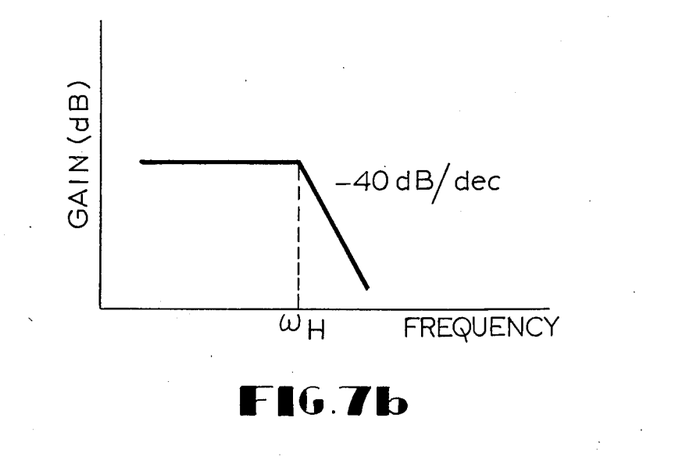
FIG. 7b is a curve illustrating the characteristics of the low-pass filter.
Figure 8A:
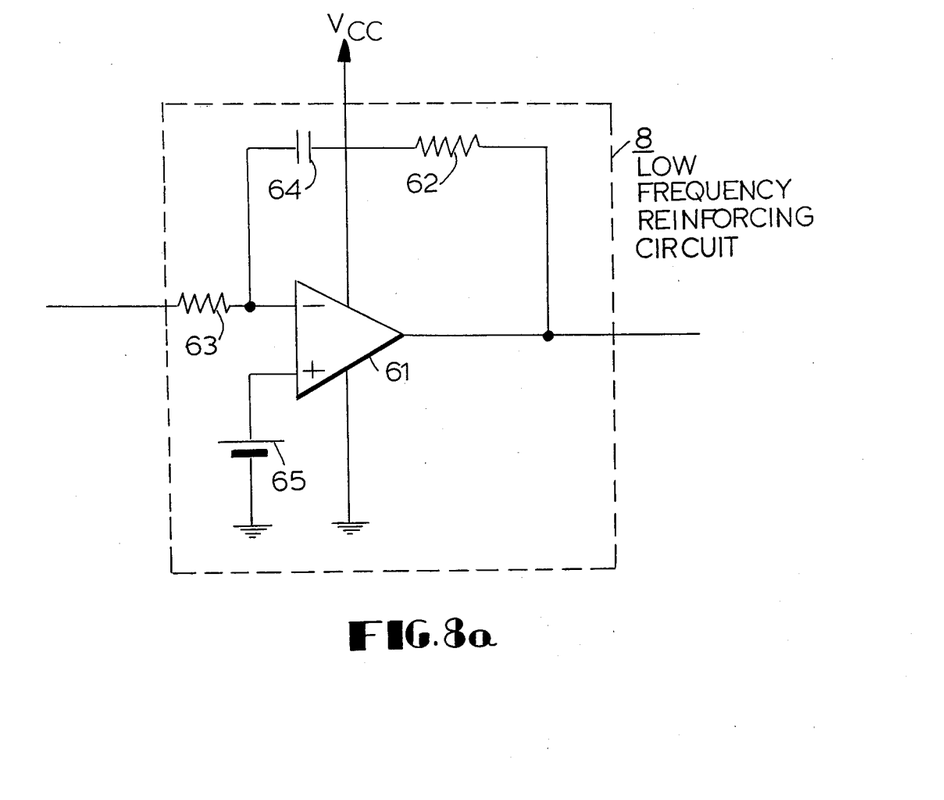
FIG. 8a is a schematic diagram of a low-frequency reinforcing circuit included within the system of FIG. 1.
Figure 8B:
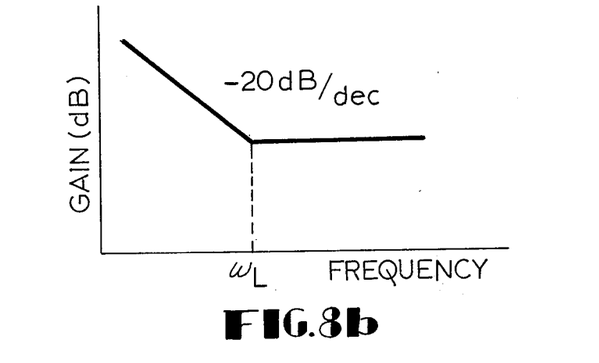
FIG. 8b is a curve illustrating the characteristics of the low-frequency reinforcing circuit.

FIG. 7a shows an embodiment of the low-pass filter 7 composed of an operational amplifier 51, resistors 52, 53 and 54, capacitors 55 and 56, and a reference voltage source 57. FIG. 7b shows a curve illustrating the characteristics of the low-pass filter 7. FIG. 8a shows an embodiment of the low-frequency reinforcing circuit 8 composed of an operational amplifier 61, resistors 62 and 63, a capacitor 64 and a reference voltage source 65. FIG. 8b shows the curve illustrating the characteristic of the low-frequency reinforcing circuit 8.

The low-pass filter 7 decreases the ripple component included in the output signal of the pulse combining circuit 6, and the low-frequency reinforcing circuit 8 reinforces the low-frequency component and the DC component included in the output signal of the low-pass filter 7.

Figure 9:
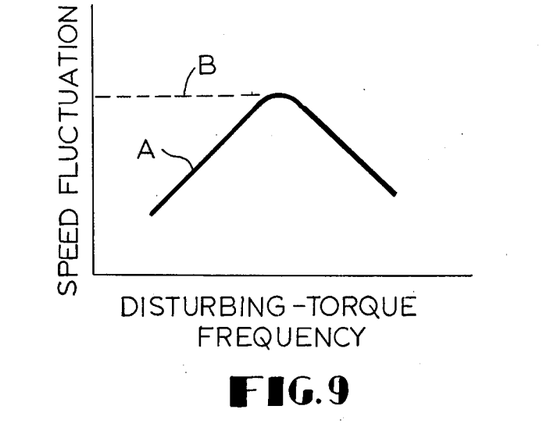
FIG. 9 shows the relationship between the disturbing-torque frequency and the speed fluctuation.

Reference symbols A and B shown in FIG. 9 are curves illustrating the relationship between the disturbing-torque frequency and the rotational speed fluctuation of the motor 1. Curve A shows the case when the speed feedback loop has the low-frequency reinforcing circuit 8, while curve B shows the case when the speed feedback loop does not have the low-frequency reinforcing circuit 8.

Figure 10:
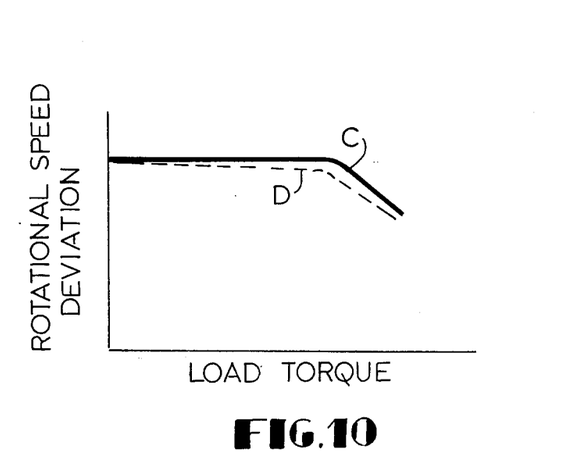
FIG. 10 shows the relationship between the load-torque and the rotational speed deviation.

Reference symbols C and D shown in FIG. 10 are curves illustrating the relationship between the load torque and the rotational speed deviation. Curve C shows the case when the speed feedback loop has the low-frequency reinforcing circuit 8, while curve D shows the case when the speed feedback loop does not have the low-frequency reinforcing circuit 8. In the speed feedback loop having the low-frequency reinforcing circuit 8, the operational amplifier 61 has a very large DC gain, which is almost infinity, so that the feedback gain of the speed feedback loop is too large to provide a substantial deviation of the rotational speed for any load torque within the controlled region, as shown by curve D of FIG. 10.

As evident from the foregoing, the speed feedback loop having the low-frequency reinforcing circuit has almost the same characteristics as those of a phase-locked loop (PLL).

Figure 11A:
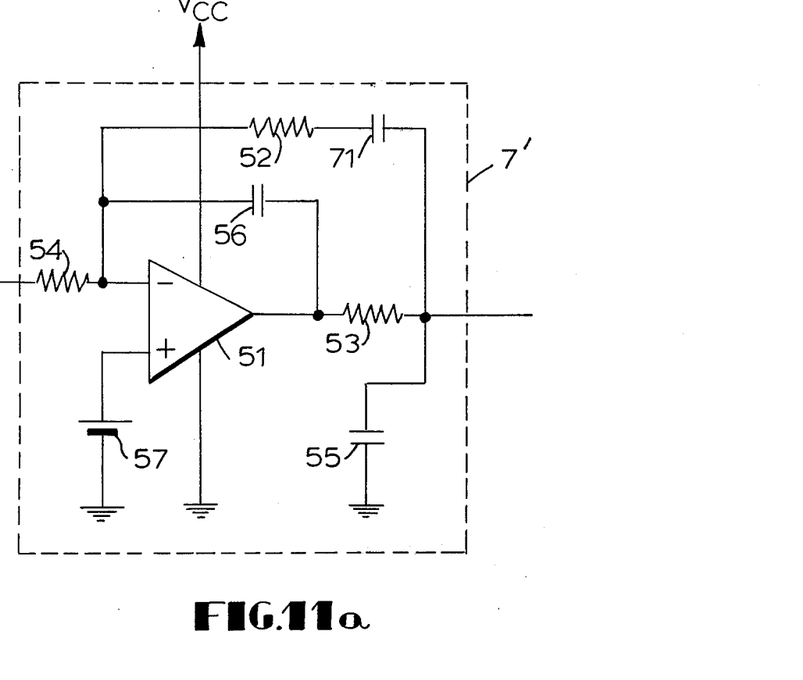
FIG. 11a is a schematic diagram illustrating the characteristics of a filter circuit composed of the low-pass filter shown in FIG. 1 and the low-frequency reinforcing circuit shown in FIG. 8.
Figure 11B:
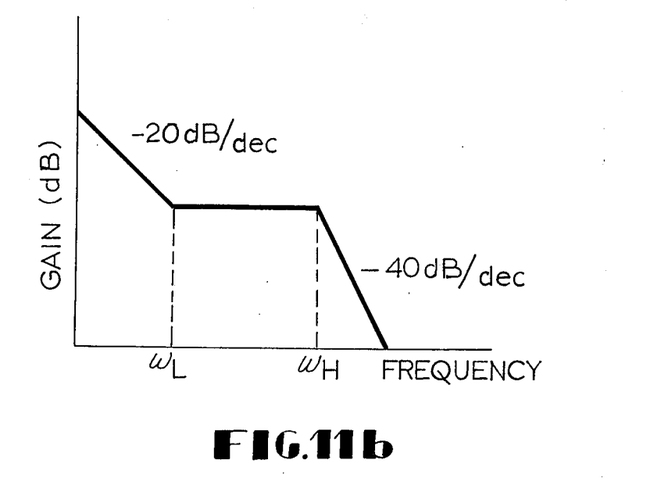
FIG. 11b is a curve illustrating the characteristics of the filter circuit.

FIG. 11a is a schematic diagram of a filter 7', in which a capacitor 71 is interposed in a part of the feedback path in comparison with the filter of FIG. 7a. Because the filter 7' has the same characteristics as those of the filter circuit composed of the low-pass filter 7 and the low-frequency reinforcing circuit 8 except for the output polarity, the construction of the speed feedback loop can be simplified by using the filter 7' instead of the low-pass filter 7 and low frequency reinforcing circuit 8.

Figure 12:
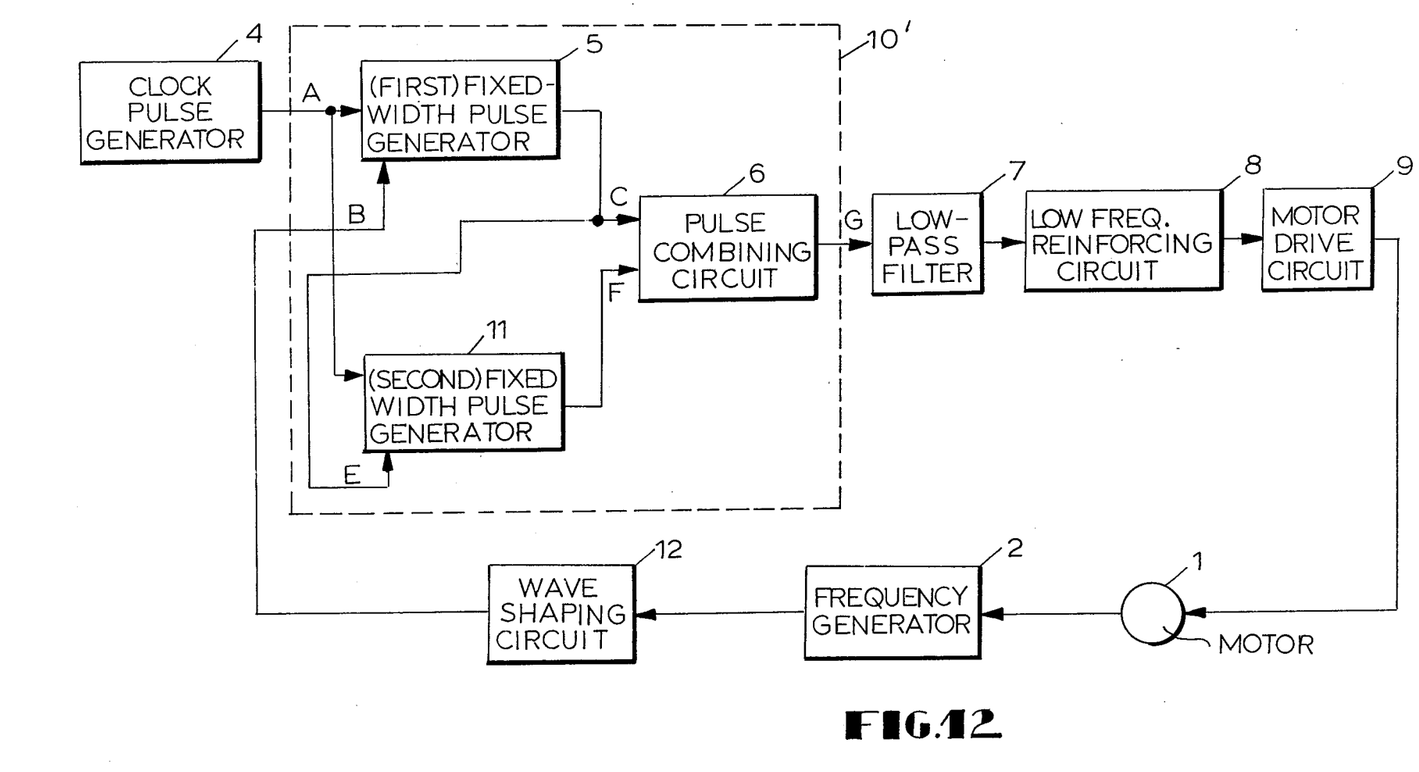
FIG. 12 is a block diagram of another embodiment of this invention.

FIG. 12 shows another embodiment of the apparatus of this invention. In this case, reference numerals 1, 2, 4, 5, 6, 6, 8 and 9 are identical numerals to those shown in FIG. 2, and are thus a motor, a frequency generator, a clock pulse generator, a (first) fixed-width generator, a pulse combining circuit, a low-pass filter, a low-frequency reinforcing circuit and a motor driving circuit, respectively.

Reference numeral 11 is a second fixed-width pulse generator, the construction of which is the same as the first fixed width pulse generator 5. Reference numeral 10' is a rotational speed-error detecting circuit composed of the first fixed-width pulse generator 5, the second fixed width pulse generator 11 and the pulse combining circuit 6. Reference numeral 12 is a wave shaping circuit for changing the output signal of the frequency generator 2 to a square wave.

Now, it is assumed that the first fixed-width pulse generator 5 is composed of a divide-by-N counter and the second fixed-width pulse generator 11 is composed of a divide-by-M counter. In FIG. 12, the output terminal of the first fixed-width pulse generator 5 is connected to the input terminal (E point) of the second fixed-width pulse generator 11. So, the second fixed-width pulse generator 11 is triggered by the negative edge of the output pulse (having a width of $N\tau$) of the first fixed-width pulse generator 5, and it generates an output pulse having a width of $M\tau$. Then, the pulse combining circuit 6 combines the two pulses, the widths of which are $N\tau$ and $M\tau$ respectively, and generates an output pulse, the width of which is proportional to the rotational speed error of the motor 1.

Figure 13:
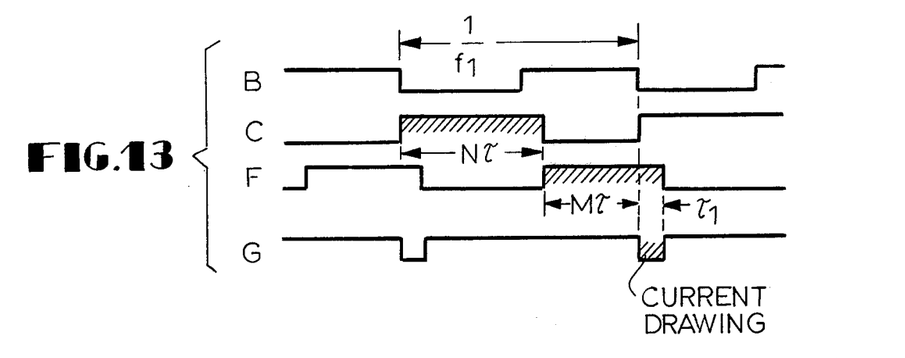
FIG. 13, FIG. 14 and FIG. 15 are timing charts for explaining the operation of the rotational speed-error detecting circuit included within the system of FIG. 12.
Figure 14:
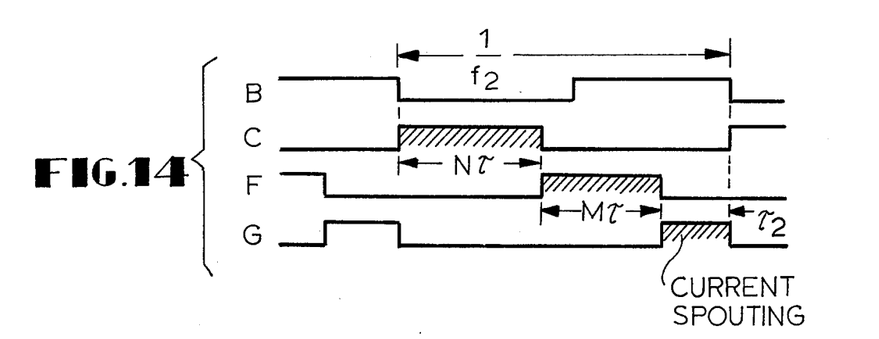
Figure 15:
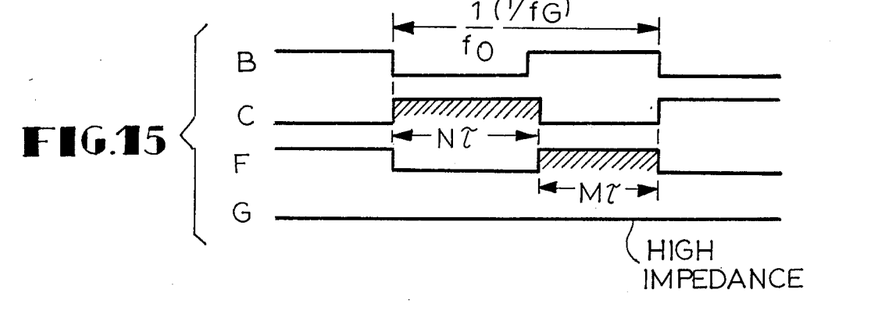

Next, the operation of the second embodiment of this invention will be described. FIG. 13, FIG. 14 and FIG. 15 show timing charts explaining the operation of the embodiment shown in FIG. 12. FIG. 13, FIG. 14 and FIG. 15 respectively show: the case when the rotational speed of the motor 1 is faster than the reference rotational speed; the case when the rotational speed of the motor 1 is slower than the reference rotational speed; and the case when the rotational speed of the motor 1 is equal to the reference rotational speed. Reference symbols B, C, F and G used in FIG. 13, FIG. 14 and FIG. 15 correspond to the symbols B, C, F and G in FIG. 12.

Referring to FIG. 13, the output frequency (at the B point) of the frequency generator 2 is $f_1$. In this case, assuming that: the value $\tau$, which is the period of the clock pulse at the A point, the value N, which is the count number of the divide-by-N counter composing the first fixed-width pulse generator 5, and the value M, which is the count number of the divide-by-M counter composing the second fixed-width pulse generator 11, are all constant values which are expressed by the following expression:

$$N\tau + M\tau = 1/f_o \qquad (5)$$

(where $f_o$ is the output frequency of the frequency generator 2, when the rotational speed of the motor 1 is locked at the reference rotational speed) during the time period $\tau_1$, which is expressed by equation (6) below, the levels at the C point and the F point both become logic "1" levels, and the state at the G point corresponds to its current-drawing mode.

$$\tau_1 = (N + M)\tau - \frac{1}{f_1} = \frac{1}{f_o} - \frac{1}{f_1} \qquad (6)$$

Accordingly, the pulse combining circuit 6 draws a current from the input of the low-pass filter 7, and drops the output voltage level of the low-pass filter 7. Because the output terminal of the low-pass filter 7 is connected to the motor drive circuit 9 by way of the low-frequency reinforcing circuit 8, the dropped output level of the low-pass filter 7 decreases the output frequency of the frequency generator 2, namely the frequency at the B point, by reducing the rotational speed of the motor 1.

Referring to FIG. 14, assuming that the output frequency of the frequency generator 2 is $f_2$, during the time period $\tau_2$ expressed by equation (7) below, the levels at the C point both and F point become the logic "0" levels and the state at the G point corresponds to its current-spouting mode.

$$\tau_2 = \frac{1}{f_2} - (N + M)\tau = \frac{1}{f_2} - \frac{1}{f_o} \quad (7)$$

Accordingly, the pulse combining circuit 6 supplies a current to the input of the low-pass filter 7 and raises the output voltage level of the low-pass filter 7. The raised output level of the low-pass filter 7 passing through the low-frequency reinforcing circuit 8 and the motor drive circuit 9 increases the output frequency of the frequency generator 2 by increasing the rotational speed of the motor 1.

Referring to FIG. 15, there is no time period in which the level at the C point and the level at the F point are the same. Accordingly, the output terminal state (at the G point) of the pulse combining circuit 6 corresponds to its high-impedance mode. Since there is no current drawing and spouting at the G point, the output voltage of the low-pass filter 7 is held constant and the rotational speed of the motor 1 is maintained constant.

As evident from the foregoing, when the rotational speed of the motor 1 is locked, the expression below is satisfied.

$$1/f_G = N\tau \quad (8)$$

where $f_o$ is the output frequency of the frequency generator 2. In this embodiment also, by replacing the fixed-width pulse generator 5 by the programmable fixed-width pulse generator 41 described in FIG. 6, the rotational speed of the motor 1 can be adjusted.

As described hereinbefore, the motor speed control apparatus of this invention has many advantageous features as can be summarized below.

(1) Although the motor speed control apparatus of this invention has one speed feedback loop, it has the same load-characteristics as those of a phase-locked motor having two control loops, namely a speed feedback loop and a phase locked loop. There is no interaction between two loops, and variations of the operating point of the control circuit due to the influence of ambient temperature changes or long term characteristic variations of the electronic components utilized does not occur.

(2) Since the rotational speed error of the motor is detected by a digital means, there is no detecting-error except for a digital bit error, and the motor rotates very stably and accurately by using the stable frequency signal (such as the output signal of a crystal oscillator) for the clock pulse.

(3) When the motor is locked, the speed-error detecting circuit (pulse combining circuit) does not draw or spout any current, and it does not generate a ripple current, so that the motor is controlled smoothly, even if the time constant of the low-pass filter is reduced.

(4) When the count number of the counter composing the rotational speed-error detecting circuit is changed in order to adjust the rotational speed of the motor, it is not necessary to adjust the operating point of the circuit composing the speed feedback loop, because the output of the rotational speed-error detecting circuit corresponds to its high impedance mode, and the rotational speed of the motor is automatically locked.

(5) According to the digital rotational speed-error detecting circuit of the embodiment of this invention, capacitors used in the conventional rotational speed-error detecting circuit comprising a sample-and-hold (S&H) circuit are not used. Accordingly, the motor speed control apparatus can be designed at a low cost e.g. by constructing it with a monolithic integrated circuit device such as an IIL device or a C-MOS device.

What is claimed is:

1. A motor speed control apparatus comprising: a motor; a frequency generating means coupled to said motor to be controlled for generating a detective frequency output signal having a frequency proportional to the rotational speed of said motor; a clock pulse generating means for generating a stable clock pulse train; a rotational speed error detecting means for generating a rotational speed error pulse train output in response to the output signals of said frequency generating means and of said clock pulse generating means, the pulse width of said rotational speed error pulse train corresponding to the rotational speed error of said motor; a low pass filtering means, coupled to said rotational speed error detecting means, for changing said rotational speed error pulse train to a smooth voltage signal corresponding to the pulse width of said rotational speed error pulse train; a low frequency reinforcing means, coupled to said low pass filtering means and comprising an active filter whose response is −20 dB/decade at its low frequency region of operation and whose response is flat at its high frequency region of operation, for reinforcing the low frequency component included in said rotational speed error pulse train; and a motor driving means, coupled to said low frequency reinforcing means, for driving said motor, whereby said motor generates a torque corresponding to the output of said motor driving means;

wherein said rotational speed error detecting means comprises:

a detective digital pulse train generating means for generating a detective digital pulse train output in response to the output signal of said frequency generating means;

a first fixed-width pulse train generating means having a divide-by-N counter (N being an integer), which starts counting the output pulses of said clock generating means when said divide-by-N counter is triggered by an edge of a predetermined polarity of said detective digital pulse train, and which generates a first fixed-width pulse train output, the pulse width of which is equal to the counting time of said divide-by-N counter;

a second fixed-width pulse train generating means having a divide-by-M counter (M being an integer), which starts counting the output pulses of said clock generating means when said divide-by-M counter is triggered by an edge of a predetermined polarity of said first fixed-width pulse train, and which generates a second fixed-width pulse train output, the pulse width of which is equal to the counting time of said divide-by-M counter; and a pulse combining circuit means having two input terminals, to one of which the output of said first fixed-width pulse train generating means is coupled, and to the other of which the output of said second fixed-width pulse train generating means is coupled, said pulse combining means producing a rotational speed-error pulse train by combining said output signal from said first fixed-width pulse train generating means and said output signal from said second fixed-width pulse train generating means.

2. A motor speed control apparatus according to claim 1, wherein said low frequency reinforcing means comprises an active filter having an operational amplifier having a series circuit of a resistor and a capacitor as a feedback component.

3. A motor speed control apparatus according to claim 1, wherein said low pass filtering means and said low frequency reinforcing means comprise a single active filter, the response of which is −20 dB/decade at its low frequency region of operation, flat at its mid frequency region of operation and −40 dB/decade at its high frequency region of operation, and said single active filter is constructed such that a capacitor is interposed in series with a feedback resistor of said low pass filtering means.

4. A motor speed ontrol apparatus according to claim 1, wherein one of said divide-by-N counter and said divide-by-M counter comprises a programmable counter, the count number of which is programmed by an external digital setting signal corresponding to the rotational speed of said motor.

5. A motor speed control apparatus according to claims 1 or 4 or 2 or 3, wherein the output of said pulse combining circuit means has one of three levels which are logic "1" level, logic "0" level and a high impedance level.

6. A motor speed control apparatus according to claim 5, wherein said pulse combining circuit comprises a two-input AND gate and a two-input OR gate, the respective inputs of said AND gate and said OR gate connected in parallel;

a series string comprising first and second transistors, said first and second transistors connected in series between a power source and ground;

wherein the respective bases of said first and second transistors are connected to respective outputs of said AND and OR gates and wherein the junction between said series connected first and second transistors comprises said pulse combining circuit output.

* * * * *